Jan. 5, 1926.
C. E. HUTCHINGS
1,568,671
RISING FRONT FOR CAMERAS
Filed April 14, 1924
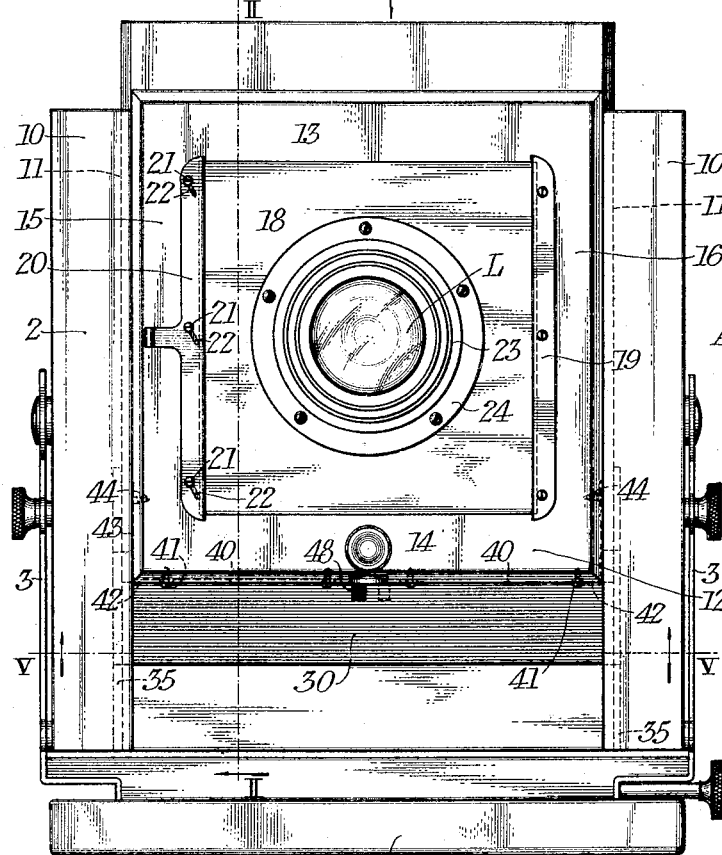
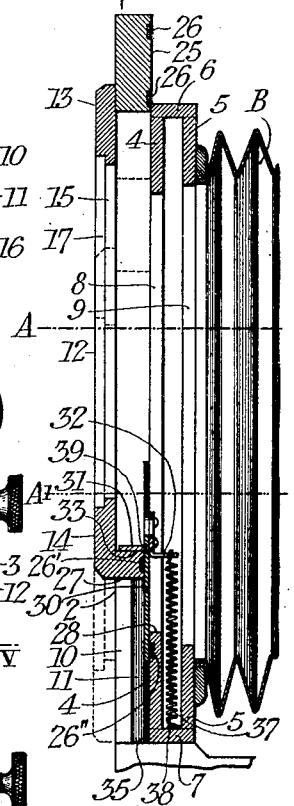
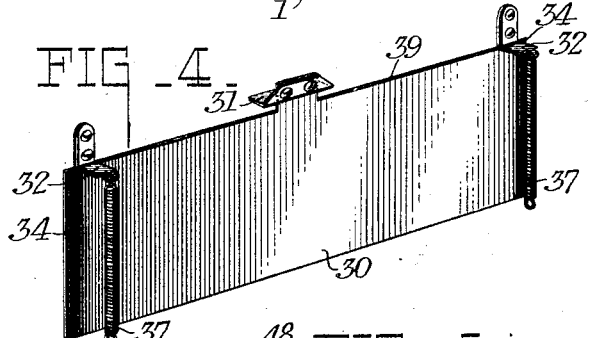
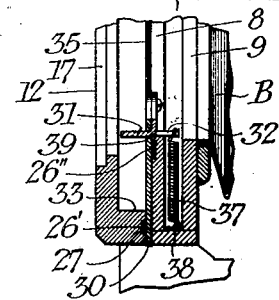
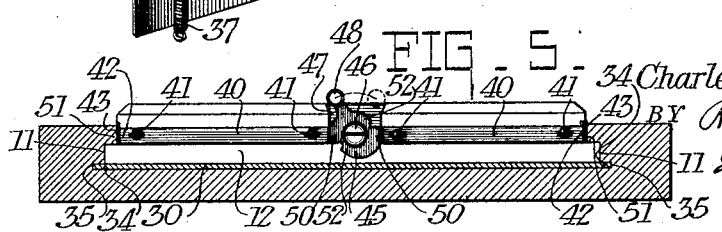
INVENTOR,
Charles E. Hutchings,
BY
ATTORNEYS.

Patented Jan. 5, 1926.

1,568,671

UNITED STATES PATENT OFFICE.

CHARLES E. HUTCHINGS, OF ROCHESTER, NEW YORK, ASSIGNOR TO EASTMAN KODAK COMPANY, OF ROCHESTER, NEW YORK, A CORPORATION OF NEW YORK.

RISING FRONT FOR CAMERAS.

Application filed April 14, 1924. Serial No. 706,582.

*To all whom it may concern:*

Be it known that I, CHARLES E. HUTCHINGS, a citizen of the United States of America, residing at Rochester, in the county of Monroe and State of New York, have invented certain new and useful Improvements in Rising Fronts for Cameras, of which the following is a full, clear, and exact specification.

This invention relates to photography and more particularly to photographic cameras. It has for its object to provide a rising front mechanism for cameras in which more than the usual movement can be secured; another object is to provide a suitable light locking device to permit the excessive movement; and still another object is to provide an automatic means for properly positioning the light guard as the front board is moved; other objects will appear from the following specification, the novel features being pointed out in the claims at the end thereof.

In the drawings wherein like reference characters denote like parts throughout:

Fig. 1 is a front elevation of a camera including a rising front constructed in accordance with and illustrating one form of my invention;

Fig. 2 is a section on line II—II of Fig. 1, with certain parts in a different position for clearness;

Fig. 3 is a fragmentary section along the same line as Fig. 2, but with the front moved to its lowermost position;

Fig. 4 is a perspective of a light guard plate and associated parts removed from the camera, and Fig. 5 is a section on line V—V of Fig. 1 showing the latching mechanism.

I have shown by way of illustration a view camera equipped with a rising front constructed in accordance with my invention. The camera consists of a base 1 which supports an upright frame member 2 by means of side brackets 3. This frame as best shown in Fig. 2 consists of a front wall 4 spaced from a rear wall 5 having top and bottom walls 6 and 7 arranged to form a box-like structure. There is a central opening 8 in the front wall and 9 in the rear wall. The side members 10 of the frame extend beyond the main frame and are grooved at 11 to form a slideway for the camera front 12. This front preferably consists of a frame consisting of upper and lower walls 13 and 14 and side walls 15 and 16. The inside of this frame carries a rabbet 17 which will receive the lens board 18. A flange 19 on one side of the frame retains one edge of the lens board in the rabbet, the other edge being held by a flange 20 mounted to slide upon studs 21 which pass through slots 22. The lens L is carried by the usual mount 23 which may be held by flange 24 attached to the lens board.

On the rear wall 25 (the wall facing the bellows B) there are strips 26 of plush to prevent light from entering between the front and the frame 8. When the axis of the lens L passes through the center of the bellows B the front covers the frame 8. In Fig. 2 the extreme rise of the front is shown and the lower wall 27 of the front lies above the edge 28 of frame 8.

In order to form a light tight connection between these walls I provide a light guard 30 in the form of a flat metal plate, as best shown in Fig. 4. This plate is provided with a flange 31 in the center and with flanges 32 at each end. The central flange 31 lies in the path of the inside edge 33 of the camera front. The edges 34 of plate 30 slide in grooves 35 which lie just behind grooves 11 in the frame member 10. Flanges 32 carry coiled springs 37 which are attached to the lower wall 7 of the frame 8 by screws 38.

When the camera front is raised wall 33 will strike flange 31 and move plate 30 upwardly against the pressure of springs 37, thus covering the space between walls 27 and 28. The edges 34 of this plate lie in grooves 35 and thus form light tight joints. The plush strip 26′ forms a light tight joint across the top and a second plush strip 26″ forms a similar joint across the bottom. When the lens front is lowered the spring 37 will draw plate 30 downwardly. As shown in Fig. 3 plate 30 comes to a stop when the upper edge 39 lies close to edge 28 of frame 8. When in this position flanges 32 rest upon this edge. Further downward movement of the front 12 does not affect plate 30.

In order to hold the camera front in the desired position there is a latch which consists (Fig. 5) of two slidable bars 40 mounted upon studs 41. The outer ends 42 of these bars rest against leaf springs 43 which are attached by screws 44 to the camera front 12. A cam 45 is pivoted at 46 in the cut-out portion 47, and carries an operating handle 48. When turned in the direction shown in full lines Fig. 5, the high points 50 of the cams rest against the ends of bars 40 pressing the springs 43 into binding engagement with the walls 51 adjacent the slideway 11. This holds the front board firmly in position. When the handle 48 is turned to the position shown in dashed lines Fig. 5 the low points 52 on the cam are opposite the ends 40 of the locking bars and the binding engagement of the springs 43 is released.

With a light guard constructed as above described the front 12 of the camera can be raised until the lens axis may lie along the line shown at A, Fig. 2. This indicates its highest position. The light guard plate 30 is automatically raised when the flange 31 is carried upwardly by the edge 33 of the front. When the front 12 is lowered to its lowermost position the axis of the lens lies along the line shown at A¹. The guard plate 30 is automatically drawn downwardly by the springs when the front board is lowered.

Having thus described my invention, what I claim as new and desire to secure by Letters Patent is:

1. In a photographic camera, the combination with a camera front adapted to move in a slideway, of a frame adjacent the slideway, and a guard plate adapted to move relative to the frame, said plate being engaged and moved by the camera front as the front is moved in its slideway, whereby light is prevented from entering between the camera front and frame.

2. In a photographic camera, the combination with a camera front adapted to move in a slideway, of a frame, the camera front being adapted to normally cover the frame, but being slidable from this normal position, and a light guard plate cooperating with the camera front and frame, a slideway for the plate, and means on the camera front and frame for resiliently holding the plate towards one member and for engaging the plate with the other member, whereby when the front is moved from its normal position the guard plate will be engaged and moved between edges of the front and frame.

3. In a photographic camera, the combination with a camera front adapted to move in a slideway, of a frame, the camera front being adapted to normally cover the frame, but being slidable from this normal position, and a light guard plate cooperating with the camera front and frame, a slideway for the plate, and means on the camera front and frame for resiliently holding the plate towards one member and for engaging the plate with the other member, whereby when the front is moved from its normal position the guard plate will be engaged and moved between edges of the front and frame, and when the frame is moved toward the frame the resilient means will return the guard plate to its initial position.

4. In a photographic camera, the combination with a camera front adapted to move in a slideway, of a frame carrying the slideway and having an opening over which the camera front may lie, a guard plate slidably mounted on the frame being normally spring held away from the opening in the frame and having a projection extending into the path of the camera front whereby when the camera front is moved from the frame the guard plate will be moved as soon as the projection is struck by the front, and will be moved to a protecting position.

5. In a photographic camera, the combination with a camera front adapted to move in a slideway, of a frame carrying the slideway and having an opening over which the camera front may lie, a guard plate slidably mounted on the frame being normally spring held away from the opening in the frame and having a projection extending into the path of the camera front whereby when the camera front is moved toward the frame the guard plate will be drawn by the spring toward the frame.

6. In a photographic camera, the combination with a camera front adapted to move in a slideway, of a slideway support including a frame having an opening which is normally closed by the front, a guard plate cooperating with the front and frame to cover edges of the frame and front when the front is moved to one position, and means to automatically move the guard plate out of alignment with the opening of the frame when the front is moved to another position.

7. In a photographic camera, the combination with a camera front adapted to move in a slideway, of a slideway support including a frame having an opening which is normally closed by the front, a guard plate cooperating with the front and frame being adapted to be moved to an operative guarding position by the front.

8. In a photographic camera, the combination with a camera front adapted to move in a slideway, of a slideway support including a frame having an opening which is normally closed by the front, a guard plate cooperating with the front and frame being movable to an operative position, and springs for moving the guard plate to the last named position.

9. In combination, a photographic camera having a front adapted to move in a slideway, a frame supporting the slideway, a second slideway in the frame, and a guard